Sept. 14, 1954  J. F. RUDE ET AL  2,688,831
MULTIPLE-GANG DISK HARROW
Filed Feb. 11, 1950  2 Sheets-Sheet 1
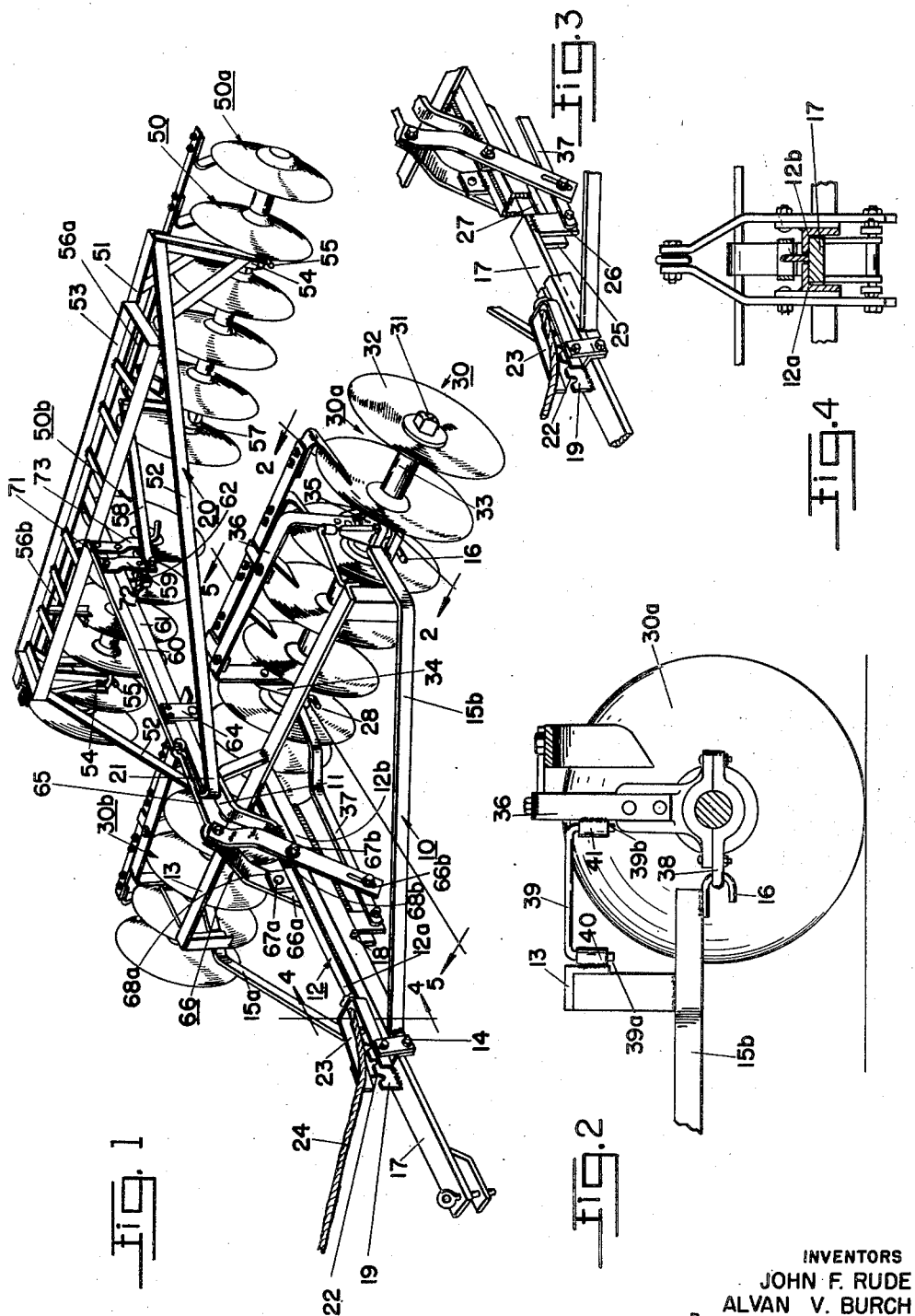
INVENTORS
JOHN F. RUDE
ALVAN V. BURCH
By *Toulmin & Toulmin*
ATTORNEYS Patented Sept. 14, 1954

2,688,831

UNITED STATES PATENT OFFICE 2,688,831

MULTIPLE-GANG DISK HARROW

John F. Rude and Alvan V. Burch, Evansville, Ind., assignors to Burch Plow Works, Inc., Evansville, Ind., a corporation of Indiana Application February 11, 1950, Serial No. 143,776

7 Claims. (Cl. 55—83)

This invention relates to disc harrows, and particularly to multiple-gang disc harrows in which the individual gangs are separately adjustable, and in which the disc gangs can be simultaneously angled by suitable mechanism interconnecting the same.

One of the principal requirements of a disc harrow is that the gangs of the harrow shall cut uniformly in depth from one end to the other of the gangs irrespective of the angled position of the gangs relative to each other.

In multiple disc gangs, it is the common practice to provide a mechanism interconnecting the forward disc gang with the rear disc gang in such a manner that angling of the forward disc gang will cause simultaneous angling of the rear disc gang. One of the difficulties is to prevent the angling mechanism from affecting the cutting depth of the forward disc gang when it is set in various angled positions, the angling mechanism usually causing an increase of pressure to be applied on the inner ends of the front gangs as they become more steeply angled, thus forcing the inner ends of the front gangs to cut more deeply than the outer ends thereof.

Also, it is desirable that the disc gangs shall be readily removable from the draft frame of the harrow for replacement and repair of the equipment.

It is therefore an object of the invention to provide a multiple gang disc harrow having a mechanism interconnecting the forward disc gang with the rear disc gang for simultaneous angling of the rear gang with the front gang, which mechanism is constructed and arranged in such a manner that operation of the angling mechanism will in no way affect the operation of the forward disc gang as to the cutting depth thereof.

It is still another object of the invention to provide a multiple disc harrow for accomplishing the purpose of the foregoing object wherein the movable draft bar connected with the inner ends of the forward disc gangs operates substantially parallel to the draft bar of the harrow so that fore-and-aft movement of the movable draft bar will not vary the effective pressure applied upon the inward ends of the disc gangs to cause them to cut at a greater depth as the angling of the gangs is increased.

It is still another object of the invention to provide a multiple disc gang harrow in which the disc gangs are readily removable from the draft frame.

It is still another object of the invention to provide a multiple disc gang harrow incorporating the purpose of the foregoing object wherein a removable draft link connects the disc gangs with the draft frame to maintain the gang standards in an upright position.

Further objects and advantages will become apparent from the drawings and the following description.

In the drawings:

Figure 1 is a perspective elevational view of a multiple disc gang harrow incorporating features of this invention;

Figure 2 is a cross-sectional view taken along line 2—2 of Figure 1 illustrating the draft link for holding the gang standards in an upright position;

Figure 3 is a perspective elevational view of the angling mechanism for the gangs of the harrow with certain parts broken away for purpose of clarity.

Figure 4 is a cross-sectional view taken along line 4—4 of Figure 1;

Figure 5:
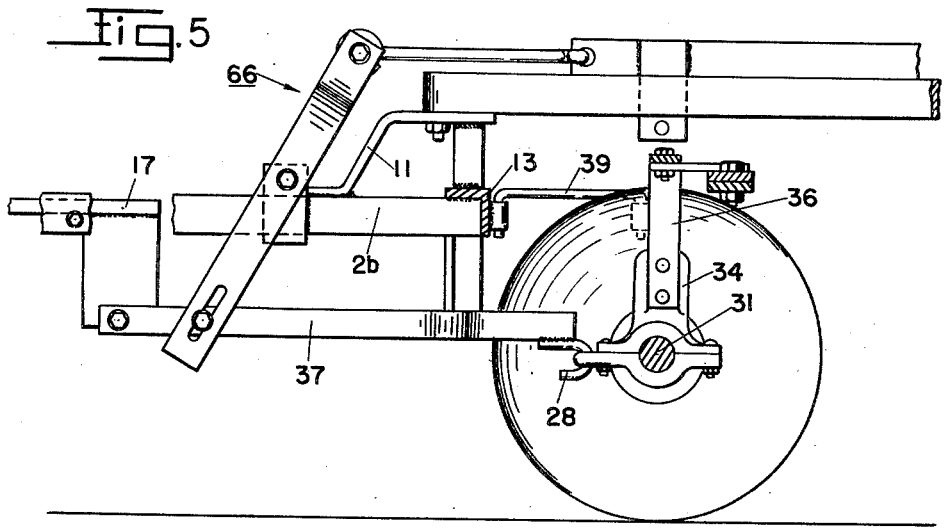
Figure 5 is a cross-sectional view taken along line 5—5 of Figure 1 illustrating the gangs in aligned position.

In this invention the multiple disc harrow consists of a forward draft frame 10 and a rear draft frame 20 that is pivotally connected to the forward draft frame by a pivot pin extending downwardly from the apex 21 of the rear draft frame 20 into an opening provided in the support bracket 11 carried on the forward draft frame 10.

The forward draft frame 10 consists of a center bar 12 comprising a pair of angle bars 12a and 12b that are joined together at one end by a cross-frame 13 suitably welded to the center bar angles 12a and 12b, as illustrated in Figure 1. The opposite ends of the center bar angles 12a and 12b are interconnected by a bolt 14 having a spacer between the angle bars 12a and 12b.

Fixed draft bars 15a and 15b extend between the outer ends of the cross-bar 13 and the center-bar 12, thus providing a substantially triangular draft frame 10. The rearward ends of the fixed draft bars 15a and 15b are provided with draft hooks 16 adapted to connect with the front disc gangs in a manner hereinafter described.

The angling mechanism for the front disc gangs consists of the draft tongue 17 that is slidable between the center bar angles 12a and 12b and rides upon the bolt 14 and the corresponding bolt 18 provided rearwardly of the bolt 14, as shown in Figure 1. The draft tongue 17 is provided with a lock bar 19 suitably welded to the tongue 17 and is provided with notches 22 that receive a lock member 23 to fixedly position the draft tongue 17 relative to the center bar 12. The lock member 23 is attached to a flexible cable 24 by which the lock member is operated to release the draft tongue 17 from the center bar 12 so that angling of the disc gangs can be obtained.

The rearward end of the draft tongue 17 carries brackets 25 and 26. A movable draft bar 27 extends from the bracket 25 and a corresponding movable draft bar 37 extends from the bracket 26 on the ends of which are provided draft hooks 28.

The front disc gang 30 consists of the individual disc gangs 30a and 30b positioned at opposite sides of the center bar 12.

The disc gang 30a consists of an axle 31 on which there is mounted a series of discs 32 held in spaced relationship by spacers 33. The axle 31 rides in an inner bearing housing 34 and an outer bearing housing 35 which are carried at the lower ends of the gang standard 36. The bearing housings 34 and 35 each have an elongated slot 38 which receive the draft hooks 16 and 28 of the fixed draft bar 15b and the movable draft bar 37, thereby providing draft means connecting the disc gang 30a with the draft frame 10.

The draft hooks 28 and 16 provide means whereby the disc gang 30a can readily be removed from the draft frame 10 by merely swinging the disc gang 30a in a clockwise direction about the draft hooks 16 and 28, as viewed in Figure 2.

Since the gang standard 36 is free relative to the draft frame 10, there is provided a draft link 39 between the cross-frame 13 of the draft frame 10 and the gang standard 36. This draft link 39 is U-shaped and has the end 39a thereof extending into an eye 40 welded to the cross-frame member 13, and the opposite end 39b extending into an eye 41 welded to the gang standard 36, as shown in Figure 2. With the link 39 extending between the cross-frame member 13 of the draft frame 10 and the gang standard 36, the gang standard is prevented from clockwise rotation about the draft hooks 28 and 16 while the harrow is in operation. With the draft links 39 in position, the draft hooks 28 and 16 cannot be removed from the slots 38 since there is insufficient fore-and-aft movement for the hooks 28 and 16 in the slots 38 to permit the hooks to be removed.

The cooperating forward disc gang 30b is constructed like the disc gang 30a heretofore described and is attached to the forward draft frame 10 in the same manner as the disc gang 30a.

The rear disc gang 50 consists of the individual gangs 50a and 50b that are attached to the draft frame 20.

The rear draft frame 20 is triangular-shaped and is composed of the cross-bar 51 and the side bars 52, a weight frame 53 being supported on the draft frame 20. The draft frame 20 also includes the vertical legs 54 that engage the outboard bearings of the disc gangs 50a and 50b with the draft hook 55 in the same manner as heretofore described with reference to the outboard bearing 35 of the forward disc gang 30a, the outboard bearings 55 being carried on the lower ends of the gang standards 56a and 56b of the disc gangs 50a and 50b, respectively. The gang standards are also provided with inboard bearings 57 that support the axle of the respective disc gangs 50a and 50b.

To provide for angling of the rear disc gangs, a movable draft bar 58 extends between the gang standard 56a and a bracket 59 that projects downwardly from an actuating bar 60 that slides upon the center bar 61 provided in the draft frame 20. A corresponding movable draft bar connects a bracket 62 on the opposite side of the bar 60 with the gang standard 56b of the rear disc gang 50b.

The actuating bar 60 is slidably retained on the center bar 61 by the cooperating brackets 59 and 62 and by brackets 64 placed on opposite sides of the center bar 61 near the forward end thereof.

To provide for angling of the rear disc gangs 50a and 50b simultaneously with angling of the forward disc gangs 30a and 30b an angling mechanism connects the movable draft bars 27 and 37 of the forward disc gangs with the actuating bar 60 of the rear disc gangs which consists of a link 65 connected at one end to the actuating bar 60 and at the opposite end to an angling lever 66. The angling lever 66 consists of a pair of bars 66a and 66b pivotally mounted on the center bar 12 by means of pivot bolts 67a and 67b that project through brackets 68a and 68b projecting from the center bar angles 12a and 12b. The lower ends of the angling lever bars 66a and 66b are each provided with an elongated slot 70. A pivot bolt 71 extends through the slots 70 into the movable draft bars 27, 37 of the forward disc gang.

From the drawings and the foregoing description it will be apparent that when the draft tongue 17 is moved toward the forward disc gang 30 upon sliding of the same within the center bar 12, the movable draft bars 27, 37 of the forward disc gang 30 will move the inner ends of the forward disc gangs 30a and 30b respectively rearwardly relative to the center bar 12, thus angling the forward disc gangs.

Figure 6:
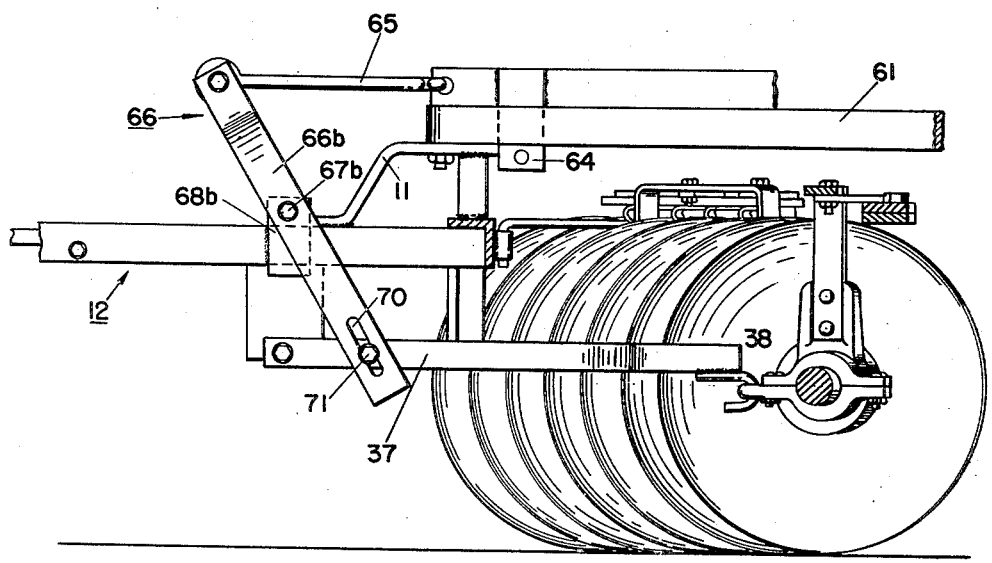
Figure 6 is a cross-sectional view similar to Figure 5 but illustrating the gangs in angled position.

Movement of the movable draft bars 27, 37 rearwardly, or to the right, as viewed in Figures 1, 5 and 6, will cause the angling lever 66 to move from the position shown in Figure 5 to the position shown in Figure 6. This movement will cause the actuating bar 60 for the rear disc gang to move forwardly, or to the left, as viewed in Figures 1, 5 and 6, thus moving the inner ends of the rear disc gangs 50a and 50b forwardly relative to the center bar 61 to angle the rear disc gangs reversely of the angling of the forward disc gangs.

To provide for independent angle adjustment of the rear disc gangs 50a and 50b relative to the forward disc gangs 30a and 30b, the brackets 59 and 62 are pivotally connected with the actuating bar 60 by means of a pivot bolt 71. An adjusting screw 72 extends between the brackets 59 and 62 and a pair of brackets 73 rigidly secured to the actuating bar 60. Thus rotation of the adjusting screw 72 between the bracket 73 and the brackets 59 and 62 will change the angle position of the rear disc gangs 50a and 50b relative to the actuating bar 60 and the center bar 61 of the rear draft frame 20.

The slotted connection between the angling lever 66 and the movable draft bars 27 and 37 permits the bars 27 and 37 to move parallel to the center bar 12 so that any fore-and-aft movement of the bars 27 and 37 will not change the angular relationship of these bars relative to the center bar 12 which would cause a change in draft pressure applied to the inner ends of the disc gangs 30a and 30b. Also, it has previously been the practice to provide the pivot bolt connection 71 between the angling lever 66 and the movable draft bars 27 and 37 merely through holes provided in the lever 66 and the bars 27 and 37, in place of the slotted connection 70 illustrated in Figures 1, 5 and 6.

The previous type of pivot connection between the angling lever 66 and the draft bars 27 and 37 causes the forward end of the draft bars to move in an arc about the pivot bolts 67a and 67b by which the angling lever 66 is pivoted onto the center bar 12. This arcuate movement of the forward end of the draft bars 27 and 37 made a change in the angular position of the bars relative to the center bar 12 and relative to the ground, upon angling of the forward disc gangs which resulted in a change in downward pressure applied to the inner ends of the disc gangs causing them to dig in deeper when the bars 27 and 37 were angled forwardly downwardly in the arcuate swing of the lever 66 and to tend to pull out of the ground when the bars 27 and 37 were angled upwardly and forwardly when the angling lever 66 was in the extreme position of angling, as shown in Figure 6.

The slotted connection 70 between the angling lever 66 and the draft bars 27 and 37 will thus permit the bars to obtain a fore-and-aft movement in a constant plane so that the downward pressure applied through the bars as a result of the draft of these bars will not affect the cutting depth of the inner ends of the disc gangs.

While the apparatus disclosed and described herein illustrates a preferred form of the invention, yet it will be understood that mechanical alterations can be made without departing from the spirit of the invention, and that all such modifications are intended to be included herein as fall within the scope of the appended claims.

Having thus fully described our invention, what we claim as new and desire to secure by Letters Patent, is:

1. In a disc harrow having a plurality of individual gangs, a draft means, a plurality of disc gangs arranged in axially aligned pairs and adapted to be angled relative to each other, said disc gangs having inner and outer ends with the inner ends of a pair of disc gangs being adjacent to each other, means providing pivotal connection of the outer end of each of the plurality of gangs to said draft means, movable means on said draft means for operable connection with the inner end of each of said gangs for angling thereof upon operation of said movable means, means for connecting said movable means and the inner end of each of said gangs, said last means being movable in a constant angular relation relative to a horizontal plane through the axes of said gangs, the connection of said last means and of said pivotal connection to said gangs consisting of an open hook connection about which the gangs are rotatable for removal from the hook connection, and a removable link connection between said draft means and each of said gangs spaced vertically from one of said hook connections to prevent the said rotation.

2. In a tiller, draft means, tilling means including means removably attaching said tilling means to said draft means, said attaching means including a rigid member having one end secured to said draft means and the other end having a hook passing through an opening in said tilling means, a second hook on said draft means to pass through a second opening laterally spaced from said first opening in said tilling means whereby said tilling means is secured against lateral movement, and a link removably connected between said tilling means and said draft means and spaced vertically above the outer of said hooks, said tilling means being removed by rotating said tilling means about said hooks after said link has been removed.

3. In a disc tiller, draft means, a disc gang having a gang standard including an in-board and an out-board bearing housing, each of said bearing housings having an opening therein to receive hook means, spaced hook means extending from said draft means and passing through said openings for securing said gang to said draft means, said gang being removable by rotation about said hook means, one of said hook means being rigid with said draft means whereby said gang standard is secured against lateral movement, and a link interconnecting said draft means with said gang standard at the out-board bearing thereof and spaced vertically from the hook means to prevent the said rotation, said link being removable from its interconnecting position whereby said gang may be rotated about said hook means.

4. In a multiple disc harrow having forward and rear individual gangs, each individual gang comprising a pair of disc gangs arranged in normal alignment and adapted to be angled relative to each other, said disc gangs having inner and outer ends with the inner ends of a pair of disc gangs adjacent to each other, draft frame means, means pivotally connecting the outer end of each disc gang to said draft frame means, a first member slidably mounted on the under surface of said draft frame means, a second member slidably mounted upon the upper surface of said draft frame means, a first means connecting said first member with the inner ends of said forward disc gangs, a second means connecting said second member with the inner ends of said rear disc gangs, a lever pivotally mounted on said draft frame means, said lever connecting said first means with said second member, and including a lost motion connection between said first means and said lever providing for straight-line movement of said first means relative to arcuate movement of the ends of said lever.

5. In a multiple disc harrow having forward and rear individual gangs, each individual gang comprising a pair of disc gangs arranged in normal alignment and adapted to be angled relative to each other, said disc gangs having inner and outer ends with the inner ends of a pair of disc gangs adjacent to each other, draft frame means, means pivotally connecting the outer end of each disc gang to said draft frame means, a first member slidably mounted on the under surface of said draft frame means, a second member slidably mounted upon the upper surface of said draft frame means, a first means connecting said first member with the inner ends of said forward disc gangs, a second means connecting said second member with the inner ends of said rear disc gangs, a lever pivotally mounted at its center on said draft frame means, opposite ends of said lever connecting said first means and said second member and including a slotted pivot connection between said first means and said lever providing for straight-line movement of said first means relative to arcuate movement of the ends of said lever.

6. In a multiple disc harrow having forward and rear individual gangs, each individual gang comprising a pair of disc gangs arranged in normal alignment and adapted to be angled relative to each other, said disc gangs having inner and outer ends with the inner ends of a pair of disc gangs adjacent to each other, draft frame means, means pivotally connecting the outer end of each disc gang to said draft frame means, a first member slidably mounted on the under surface of said draft frame means, a second member slidably mounted upon the upper surface of said draft frame means, a first means connecting said first member with the inner ends of said forward disc gangs, a second means connecting said second member with the inner ends of said rear disc gangs, a lever pivotally mounted at its center on said draft frame means, a slot in one end at said lever to receive a pin secured to one end of said first means thereby providing a lost motion connection between said lever and said first means, and a pivot connection between the other end of said lever and said second member.

7. In a multiple disc harrow having forward and rear individual gangs, each individual gang comprising a pair of disc gangs arranged in normal alignment and adapted to be angled relative to each other, said disc gangs having inner and outer ends with the inner ends of a pair of disc gangs adjacent to each other, draft frame means, means for providing a pivotal connection to the outer ends of said disc gangs to said draft frame means, said means comprising an open hook connection, a first member slidably mounted on the under surface of said draft frame means, a second member slidably mounted upon the upper surface of said draft frame means, a first means comprising an open hook connection connecting said first member with the inner ends of said forward disc gangs, a second means comprising an open hook connection connecting said second member with the inner ends of said rear disc gangs, said forward and rear disc gangs being removable by rotation about said hooks, a lever pivotally mounted on said draft frame means, said lever connecting said first means with said second member and including a lost motion connection between said first means and said lever providing for straight-line motion of said first means relative to arcuate movement of the ends of said lever.

References Cited in the file of this patent

UNITED STATES PATENTS

| Number | Name | Date |
|---|---|---|
| 427,854 | Glass | May 13, 1890 |
| 485,666 | Sharp | Nov. 8, 1892 |
| 528,173 | Macphail | Oct. 30, 1894 |
| 1,113,241 | Neisz | Oct. 13, 1914 |
| 1,457,277 | Warne | May 29, 1923 |
| 1,466,063 | Ringle et al | Aug. 28, 1923 |
| 1,472,515 | Dickinson | Oct. 30, 1923 |
| 1,525,335 | Sutfin | Feb. 3, 1925 |
| 1,667,392 | Robinson | Apr. 24, 1928 |
| 1,718,796 | Mowry | June 25, 1929 |
| 1,748,393 | Peterson | Feb. 25, 1930 |
| 1,967,493 | Boda | July 24, 1934 |